UNITED STATES PATENT OFFICE.

JONATHAN BLISS, OF JERSEY CITY, NEW JERSEY, AND FRANKLIN O. BADGER, OF BROOKLYN, NEW YORK, ASSIGNORS, BY MESNE ASSIGNMENTS, TO WILFORD L. PALMER, OF NEW YORK CITY.

IMPROVEMENT IN PROCESSES OF TREATING BLOOD FOR FORMING ORNAMENTAL ARTICLES.

Specification forming part of Letters Patent No. 193,846, dated August 7, 1877; application filed April 20, 1877.

*To all whom it may concern:*

Be it known that we, JONATHAN BLISS and FRANKLIN O. BADGER, the said BLISS being a resident of Jersey City, county of Hudson, and State of New Jersey, and the said BADGER being a resident of Brooklyn, county of Kings, and State of New York, have invented a new and useful Improvement in Treating Blood for Making Articles of Use and Ornament, which improvement is fully set forth in the following specification.

This invention relates to the treatment and use of blood for making therefrom articles of use and ornament; and it consists in bringing the blood to a fine or powdered condition, and subjecting it to pressure in heated molds, which give to it the required form of the article to be produced.

After the article is taken from the mold it can be polished in the manner employed for polishing jewelry, or articles made of india-rubber.

In carrying out our invention we take blood and dry it to such a state that it can be ground or pulverized. We then grind or pulverize it, and if any coarse particles are yet present we sift it through a fine sieve, so as to separate the coarse particles from it and obtain the pulverized material of a general uniform degree of fineness. The fine material is then put into molds or dies of any desired form or pattern, according to the shape of the article which is to be made, and it is subjected for about five to ten minutes to sufficient pressure to bring the powdered material into a permanent and solid condition, having the form of the molds or dies, the molds or dies being heated to about 200° to 300° Fahrenheit. We have found a temperature of 245° Fahrenheit to produce satisfactory results; but we do not wish to confine ourselves to any particular measure of heat, so long as the heat is sufficient along with the pressure employed to allow the powdered material to take a solid or permanent form. The pressure to be employed varies according to the solidity which is to be given to the articles; some articles—such, for example, as rollers, or caster-wheels, or handles for tools—requiring more pressure than articles which are not subjected in use to severe strains. We have used different degrees of pressure in making different articles, and have sometimes used a pressure of nearly forty tons in molding articles of our material.

We make with our material various kinds and descriptions of articles of use or ornament—such, for example, as wheels, stocks, or handles for brushes and other tools or implements, rollers for casters and other purposes, brooches and other ornaments, giving to them a smooth or plain surface or an ornamented or figured surface, as may be desired.

We do not claim as our invention the process of making composite articles consisting of first mixing organic or inorganic substances with blood, then subjecting the mass so formed to heat, and finally compressing said mass under great pressure in heated molds of any desired form, such process being not new.

What we claim, and desire to secure by Letters Patent, is—

The process of treating blood alone for making articles of use or ornament by reducing it to a dry and powdered or fine condition, and subjecting it to heat and pressure in suitable molds or dies, substantially as set forth.

In testimony that we claim the foregoing we have hereunto set our hands and seals this 6th day of April, A. D. 1876.

JONA. BLISS. [L. S.]
FRANKLIN O. BADGER. [L. S.]

Witnesses:
ROBT. E. MILLER,
W. HAUFF.